UNITED STATES PATENT OFFICE.

ROBERT H. PEAK, OF ORLANDO, FLORIDA.

PROCESS OF PRODUCING MAGNETIC OXID OF IRON.

SPECIFICATION forming part of Letters Patent No. 607,875, dated July 26, 1898.

Application filed May 20, 1896. Serial No. 592,349. (No specimens.)

*To all whom it may concern:*

Be it known that I, ROBERT H. PEAK, a citizen of the United States, residing at Orlando, in the county of Orange and State of Florida, have invented certain new and useful Improvements in Processes of Producing Magnetic Oxid of Iron; and I do hereby declare the following to be a full, clear, and exact description of the invention, such as will enable others skilled in the art to which it appertains to make and use the same.

This invention relates to processes for converting ferric oxid into magnetic oxid of iron; and it consists in an improved process for the treatment of ferric oxid for such purpose, as hereinafter described and claimed.

The ferric oxid is first finely ground, so that it will pass through a sixty-mesh screen. The more finely it is ground and the purer the oxid the better is the result. The ferric oxid thus prepared is then placed in an airtight vessel or retort, a revolving retort being preferable, and subjected to heat at a temperature somewhat below the fusing-point from one hour and a half to two hours. It is then allowed to cool in its own gases, the air being entirely excluded, and the result is that the ferric oxid is converted into magnetic oxid of iron, the mass being magnetic in proportion to the purity of the ferric oxid thus treated.

For the thorough magnetization of the ore it is kept in a state of agitation during the treatment of it, this preventing fusion and causing every particle to become thoroughly magnetized. For such purpose a revolving retort is preferably employed to contain the ore, the latter being heated to a temperature slightly below the fusing-point. Every particle of the pulverized ore is thus subjected to the treatment, no part of it being fused, and when the material is allowed to cool in its own gases the conversion of the entire mass from ferric oxid to magnetic oxid will be completely effected without the agency of a reducing-gas.

When the ferric oxid is pure or contains not more than ten per centum of finely-ground clay or sand, on being treated by the process above set forth a black magnetic oxid of iron is produced. The black thus produced can, in combination with oils and other ingredients usually employed, be used in making black paint. It can be employed in making printers' black ink, and it can also be employed as a coloring in all cases in which a dry black can be used.

I claim—

The process of converting ferric oxid into magnetic oxid, which consists in heating dry, finely-pulverized ferric oxid to a temperature somewhat below the fusing-point of the oxid, maintaining such temperature a suitable length of time under exclusion of atmospheric air, keeping the oxid in motion while being exposed to such temperature, and then allowing it to cool in its own gases while the atmospheric air is excluded, as herein set forth.

In testimony whereof I affix my signature in presence of two witnesses.

ROBERT H. PEAK.

Witnesses:
CECIL G. BUTT,
A. MACCALLUM.